United States Patent [19]

Rooney

[11] Patent Number: 4,840,476
[45] Date of Patent: Jun. 20, 1989

[54] COMPACT EYEGLASS CONSTRUCTION

[75] Inventor: Craig E. Rooney, Prairie Village, Kans.

[73] Assignee: John Gareis, Kansas City, Mo.

[21] Appl. No.: 140,300

[22] Filed: Dec. 31, 1987

[51] Int. Cl.⁴ ............................................. G02C 5/08
[52] U.S. Cl. .................................................... 351/63
[58] Field of Search ........................ 351/59, 60, 61, 63, 351/64

[56] References Cited

U.S. PATENT DOCUMENTS 2,019,345 10/1935 Gulotta .................................. 351/63

Primary Examiner—Rodney B. Bovernick
Assistant Examiner—P. M. Dzierzynski
Attorney, Agent, or Firm—Kokjer, Kircher, Bradley, Wharton, Bowman & Johnson

[57] ABSTRACT

Reading glasses are specially constructed to permit them to assume a compact storage condition when not in use. Lightweight half lenses are pivoted to the lower ends of an arched nose bridge which functions as a spring to provide the sole force necessary to maintain the eyeglasses on the nose. The lenses may pivot about pivot pins on the nose bridge through pivot arcs of 90° between the wearing and storage positions. The lenses occupy a common plane in all positions. Notches in the lens edges receive the legs of the nose piece to provide a detent for retaining the lenses in the wearing position.

13 Claims, 1 Drawing Sheet

COMPACT EYEGLASS CONSTRUCTION

BACKGROUND OF THE INVENTION

This invention relates generally to eyeglasses and more particularly to reading glasses which are constructed in a novel manner permitting them to assume a compact storage condition for carrying in the pocket when not in use.

Farsightedness is a common malady which afflicts a large number of persons. Although farsighted persons see well at a distance and do not often require optical correction in order to see distant objects, close-up work such as reading or threading a needle requires magnification that is usually provided by reading glasses. Consequently, the farsighted person has a peculiar problem in that he or she must have reading glasses available for use in the event that the need for reading or other close-up work arises. However, the glasses are not needed for most activities and are thus carried for the most part and are actually used only a small part of the time.

This situation can create considerable aggravation because eyeglasses are typically rather bulky and difficult and cumbersome to carry on the person, especially for those who are physically active. Eyeglasses are rather fragile and are normally carried in a protective case which must be located and opened and closed each time the glasses are needed for use and each time they are put away following use. Moreover, it is not at all uncommon for reading glasses to be lost or misplaced because they are used only occasionally and it is easy for the wearer to leave them lying around when they are not being used.

These drawbacks with conventional eyeglasses and reading glasses have led to many proposed constructions which permit the glasses to be folded up to a compact position for storage. Both reading type "half glasses" and more conventional glasses have been offered in hinged or sliding arrangements that accommodate compact storage. However, the compact glasses that have been proposed have not met with appreciable commercial success, largely because the increased cost and complexity and the functional degradation have outweighed the somewhat marginal advantages that have been achieved in size reduction. The sliding mechanisms and hinge constructions that have been proposed are so cumbersome and mechanically sensitive that they add significantly to the overall cost and require frequent adjustments and other maintenance. Folding up of the bows and ear pieces has been a particularly difficult problem.

SUMMARY OF THE INVENTION

It is thus apparent that a need remains for an eyeglass construction which allows eyeglasses to assume a compact condition for storage without adding undue complexity or excessive cost. It is the principal goal of the present invention to meet that need.

More specifically, the present invention provides an improved eyeglass construction which in large measure solves the problems that have plagued prior art devices. In accordance with the invention, a pair of unframed "half" lenses of the type commonly used in magnifying reading glasses are pivoted to a nose bridge which may take the form of an arched spring wire. The lower ends of the two legs of the nose bridge are bent to provide pivot pins which are extended through bushings fitted in the lenses in their lower inside quadrants. The lenses can be pivoted about the pins in a common plane through a 90 degree arc to carry them between a wearing position and a storage position in which the glasses are small enough to fit in a pocket size carrying case.

The unique construction and arrangement of the nose bridge allow it to serve a variety of functions. The nose bridge has a spring construction which urges its legs toward the opposite sides of the nose to provide all of the force that is necessary to maintain the glasses in place on the nose. The combination of a relatively long nose bridge which provides spring flexure, light-weight synthetic resin half lenses of minimum size, and the high arch of the nose bridge reduces the forces tending to cause falling, tilting or sliding of the glasses off of the nose. Consequently, the spring pressure that is required to retain the glasses in place is decreased significantly, and the glasses of the present invention can be worn comfortably and securely without the need for bows and ear pieces. These components are thus eliminated along with the lens frames that normally hold the lenses.

The arched nose bridge also has its legs bent so that they are maintained by spring action against the edges of the lenses. The lenses are retained in the wearing position by a detent arrangement which includes notches in the lens edges that receive the nose bridge. The pivot pins on the nose bridge legs have tips that are bent to conform with flared ends of their bushings in order to assist in holding the lenses and the upper parts of the legs together by spring action.

The overall result of the novel construction of the present invention is a compact eyeglass configuration that is light in weight, low in cost, and easily stored in a pocket size hard shell case, all without detracting from their functional capabilities. This construction is particularly well suited for magnifying type reading glasses which include half lenses and which are needed only occasionally when reading or other close-up work is undertaken.

DESCRIPTION OF THE DRAWING

In the accompanying drawing which forms a part of the specification and is to be read in conjunction therewith and in which like reference numerals are used to indicate like parts in the various views.

DETAILED DESCRIPTION OF THE INVENTION

Figure 2:
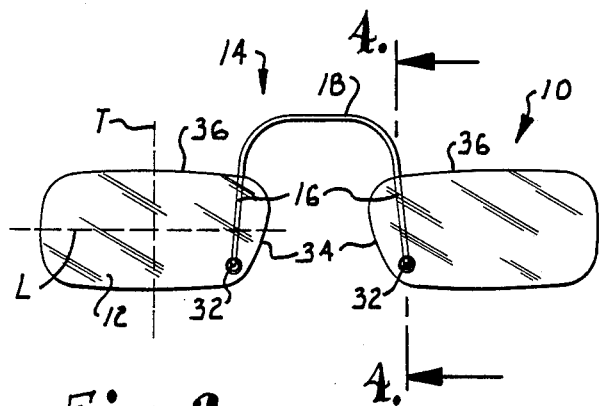
FIG. 2 is a front elevational view of the eye glasses in the wearing position of the lenses.

Referring now to the drawing in more detail, numeral 10 generally designates a pair of eyeglasses constructed in accordance with a preferred embodiment of the present invention. The glasses 10 may be magnifying reading glasses of the type commonly used by farsighted persons in doing reading and other closeup work. The glasses 10 include a pair of "half" lenses 12 which may be constructed of a light weight synthetic resin. As best shown in FIG. 2, the left and right lenses are mirror images of one another, and each lens 12 has a longitudinal axis L which extends along the longitudinal dimension of the lens and a transverse axis T which extends along the transverse dimension of the lens. The longitudinal and transverse axes L and T divide each lens 12 into four quadrants which may be referred to as the lower inside and outside quadrants and the upper inside and outside quadrants. Each lens 12 is generally planar although slightly curved and thicker in some places than in others.

The two lenses 12 are connected with a nose bridge which is generally identified by reference numeral 14. The nose bridge 14 is an arch shaped member having the configuration of an inverted U. Preferably, the nose bridge 14 is constructed from spring wire, although other materials are possible. The nose bridge includes a pair of generally parallel legs 16 which are joined at their upper ends by a curved bight or arch portion 18. The legs 16 are spaced apart far enough to bracket the human nose 20 (see FIG. 1 of a wearer of the glasses 10), and the legs diverge somewhat from top to bottom to generally conform with the shape of the nose 20. The lenses 12 are located in front of the nose bridge 14.

Figure 4:
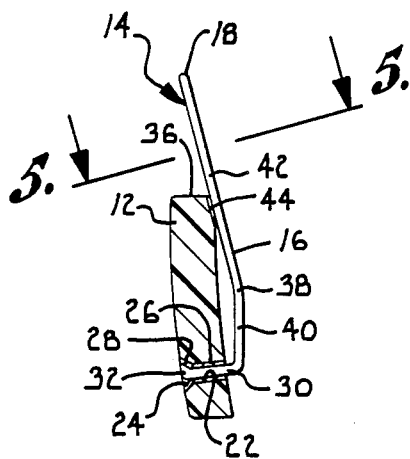
FIG. 4 is a sectional view on an enlarged scale taken generally along line 4—4 of FIG. 2 in the direction of the arrows.

Referring particularly to FIG. 4, a generally cylindrical passage 22 extends through each lens 12 between its front and back surfaces in the lower inside quadrant of the lens near the junction between the lower and inside edges of the lens. The end portion of each passage 22 adjacent the outer or front side of the lens is flared at 24. A bushing 26 is fitted closely in each passage 22. Each bushing 26 is generally cylindrical to fit closely in passage 22, and each bushing 26 has a flared end 28 which fits closely in the fixed end 24 of the passage 22.

With continued reference to FIG. 4, the bottom end of each leg 16 of nose piece 14 is bent at a substantially 90° angle to form a pivot pin 30 which is fitted through the corresponding bushing 26. Each pin 30 terminates in a bent tip 32 which is turned upwardly to lie along and generally conform with the angle of the flared end 28 of bushing 26. The bent tips 32 of pins 30 retain the lenses 12 on the nose bridge 14 and act to maintain the edges of the lenses against the legs 16, as will be explained more fully. The ends of tips 32 are ground flush with the front surfaces of the lenses.

Figure 1:
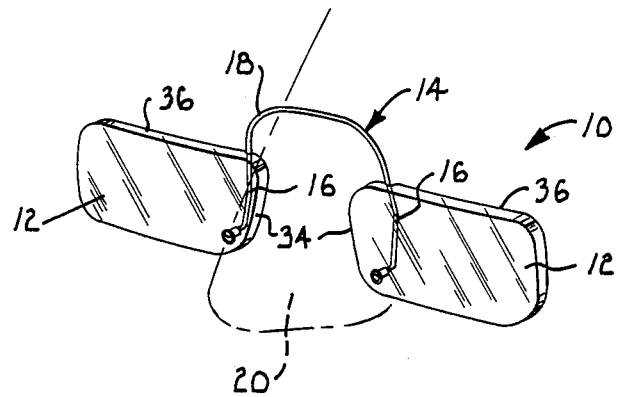
FIG. 1 is a perspective view showing a pair of eyeglasses constructed according to a preferred embodiment of the present invention worn on the nose.
Figure 3:
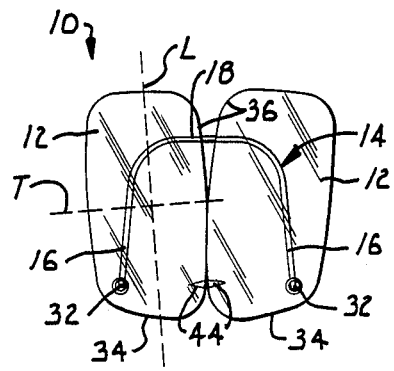
FIG. 3 is a front elevational view similar to FIG. 2, but showing the lenses in the storage position.

The pivot pins 30 provide substantially parallel axes about which the lenses 12 may be pivoted between the expanded wearing condition shown in FIGS. 1 and 2 and the compact storage position shown in FIG. 3. In the wearing position, the longitudinal axes L of the two lenses are substantially aligned and the transverse axes T are parallel to one another. The inside edge 34 of each lens projects inwardly beyond leg 16 and provides a nose engaging edge for contact with the nose when the glasses are worn. The edges 34 taper or diverge from top to bottom in order to generally conform with the shape of the nose 20.

In the storage position, the lenses 12 are each pivoted through an arc of approximately 90° from the wearing position. The upper edges 36 of lenses 12 abut one another in the storage position, and the longitudinal axes L are substantially parallel to one another with the transverse axes T in alignment. The lateral diameter of the glasses 10 in the storage position is approximately twice the transverse dimension of each lens, while the up and down dimension of the glasses 10 is equal to the longitudinal dimension L of each lens in the storage position.

The lenses 12 occupy the same plane in the storage position and in the wearing position and all positions in between.

As best shown in FIG. 4, each leg 16 is bent at 38 at a location somewhat above the pin 30. A lower leg portion 40 is defined on each leg below the bend 38, while an upper leg portion 42 is defined above the bend 38. The leg portions 42 incline toward lenses 12 as they extend upwardly and are urged by spring action to engage the peripheral edges of the lenses 12. The bent tips 32 cooperate with the bent legs 16 to assure that the legs are maintained by spring action against the edges of the lenses.

Figure 5:
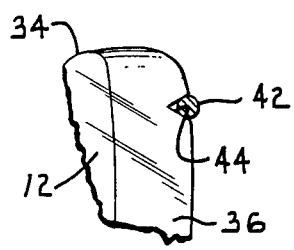
FIG. 5 is a fragmentary sectional view of an enlarged scale taken generally along line 5—5 of FIG. 4 in the direction of the arrows.

Referring now to FIG. 5, a small V-shaped notch 44 is formed in the upper edge 36 of each lens 12 near its intersection with the tapered inside edge 34. The notches 44 are located to register with leg portions 42 when lenses 12 are in the wearing position. The spring action provided by the nose bridge 14 acts to maintain the leg portions 42 in notches 44 to provide a detent arrangement for maintaining lenses 12 in the wearing position. When sufficient rotational force is applied to each lens 12, the leg portion 42 releases from notch 44 and the lens can then be rotated to the storage position.

The arch 18 of nose bridge 14 extends well above the upper edges 36 of lenses 12, and the nose bridge 14 is thus able to span the nose 20 when the glasses 10 are applied to it. When the glasses are worn, they are pressed onto the nose 20 at a location somewhat low on it as shown in FIG. 1. The tapered edges 34 are pressed against the opposite sides of the nose, and this spreads the legs 16 apart somewhat. Due to the spring construction of nose bridge 14, legs 16 resist the outward displacement and apply inward forces to lenses 12 which maintain edges 34 pressed firmly against the opposite sides of the nose, thus acting to retain the glasses 10 in place on the nose.

The spring construction and lengthy arch shaped configuration of the nose bridge 14 causes it to function as a long, relatively weak spring which is able to lightly pressure the nose bearing surfaces 34 against the fleshy part of the nose. Because the nose bridge 14 has a high arch 18, the glasses can be worn low on the nose. The combination of the light weight material of which the lenses 12 are constructed, the long nose bearing surfaces 34 and the resilient spring action of the nose bridge 14 eliminates many of the overturning and sliding forces that are normally associated with holding glasses in place. As a consequence, the spring pressure that is needed to hold the glasses 10 in place is not particularly great, and the nose bridge 14 must exert only light pressure against the nose in order to comfortably and securely hold the glasses in place.

The unique construction of the glasses 10 permits elimination of the usual bows and ear pieces, along with the frames that normally hold eyeglass lenses. This reduces the weight and size of the glasses and the number of components that are required. Additionally, the eyeglass construction permits the lenses to assume the compact storage position shown in FIG. 3 wherein the glasses can easily fit in a hard shell container or other container which may be carried in the pocket. The eyeglass construction minimizes bulk and avoids presenting sharp edges or corners that could cause discomfort to the user. At the same time, the construction and configuration of the glasses allows them to accommodate a wide variety of nose shapes and sizes. The lenses 12 are symmetrical with respect to the nose bridge 14 in both the wearing and storage positions.

It is contemplated that the pivot pins 30 may either be parallel or offset slightly so that the spring force would be somewhat reduced agsinst the lenses in their storage position. It is also contemplated that the nose bridge 14 may have shapes other than the arch configuration shown in the drawing. For example, it maybe desirable to provide the nose bridge with a shape such as that of a hip roof or some other shape that is easily bent, as it may be desirable to bend the nose bridge so that it can accommodate unusually shaped noses. It should also be noted that the pivot pin and bushing arrangement can have various constructions other than the flared configuration.

From the foregoing, it will be seen that this invention is one wall adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention,

I claim:

1. An eyeglass construction comprising:
a pair of lenses each having a longitudinal axis and a shorter transverse axis;
an arched nose bridge having a pair of spaced apart lower ends; and
means for mounting said lenses on the respective lower ends of said nose bridge in a manner permitting the lenses to pivot about substantially parallel pivot axes between a wearing position wherein the transverse axes of the lenses are generally parallel and a compact storage position wherein the longitudinal axes of the lenses are generally parallel, said mounting means comprising a passage formed through each lens, a bushing fitted in each passage, and a pivot pin on each of said lower ends of the nose bridge, said pivot pins being fitted in the respective bushings and being rotatable therein to mount the lenses on the nose bridge.

2. The eyeglass construction of claim 1, wherein said nose bridge has an arch portion extending above the lenses in the wearing position.

3. The eyeglass construction of claim 1, wherein each lens comprises a frameless half size reading glass magnifying lens.

4. The eyeglass construction of claim 1, wherein:
said nose bridge includes a pair of spaced apart legs on which the respective lower ends are located; and
said nose bridge has a spring construction urging said legs together by spring action when spread apart to hold the eyeglasses on the nose when applied thereto with the legs spread apart on opposite sides of the nose.

5. The eyeglass construction of claim 4, including a nose engaging edge of each lens for contact with the nose in the wearing position, said nose engaging edges being arranged to diverge from top to bottom to generally conform to the shape of the human nose.

6. The eyeglass construction of claim 4, wherein:
said nose bridge is arranged to bear against edge portions of the lenses by spring action; and
each lens is provided with a notch therein at a location to receive the nose bridge in the wearing position, thereby providing a detent for holding the lenses in the wearing position.

7. The eyeglass construction of claim 6, wherein each leg is bent toward the corresponding lens at a location between the lower end of the leg and an arch portion of the nose bridge.

8. The eyeglass construction of claim 1, wherein:
each passage has a flared end portion;
each bushing has a flared end portion fitted in the flared end portion of the corresponding passage; and
each pivot pin has a tip which is bent in said flared portion of the corresponding bushing to retain the pin in the bushing.

9. The eyeglass construction of claim 1, wherein:
the axes of each lens define four quadrants of the lens; and
said pivot axes are located on the lower inside quadrants of the respective lenses in the wearing position.

10. The eyeglass construction of claim 1, including releasable detent means for maintaining said lenses in the wearing position.

11. Frameless reading glasses comprising:
a pair of unframed half size reading glass magnifying lenses each having a longitudinal dimension and shorter transverse dimension;
an arched nose bridge having a pair of spaced apart legs, said nose bridge having a spring construction to urge said legs together by spring action when spread apart;
means for pivotally connecting said lenses with the respective legs of said nose bridge to permit pivotal movement of the lenses about substantially parallel pivot axes between a wearing position wherein the lenses are spaced apart and the transverse dimensions of the lenses are substantially parallel and a compact storage position wherein the lenses are adjacent and the longitudinal dimensions of the lenses are substantially parallel, said legs of the nose bridge being spread apart when the glasses are applied to the nose of a wearer with the spring force applied to the nose by the legs acting to retain the glasses on the nose; and
a nose engaging edge of each lens for contacting the nose in the wearing position, each nose engaging edge being tapered to generally conform to the shape of the human nose.

12. The reading glasses of claim 11, including releaseable detent means for retaining said lenses in the wearing positions.

13. An eyeglass construction comprising:
a pair of lenses each having a longitudinal axis and a shorter transverse axis;
an arched nose bridge having a pair of spaced apart legs terminating in respective lower ends, said nose bridge having a spring construction urging said legs together by spring action when spread apart to hold the eyeglasses on the nose when applied thereto with the legs spread apart on opposite sides of the nose;

means for mounting said lenses on the respective lower ends of said nose bridge in a manner permitting the lenses to pivot about substantially parallel pivot axes between a wearing position wherein the transverse axes of the lenses are generally parallel and a compact storage position wherein the longitudinal axes of the lenses are generally parallel, said nose bridge being arranged to bear against edge portions of the lenses by spring action; and a notch in each lens at a location to receive the nose bridge in the wearing position, thereby providing a detent for holding the lenses in the wearing position.

* * * * *